(12) United States Patent  (10) Patent No.: US 7,918,035 B1
Jarczewski  (45) Date of Patent: Apr. 5, 2011

(54) SKATE BLADING SQUARENESS INDICATOR

(76) Inventor: Brian Jarczewski, Cheektowaga, NY (US)

( * ) Notice: Subject to any disclaimer, the term of this patent is extended or adjusted under 35 U.S.C. 154(b) by 190 days.

(21) Appl. No.: 12/420,741

(22) Filed: Apr. 8, 2009

Related U.S. Application Data

(60) Provisional application No. 61/043,201, filed on Apr. 8, 2008.

(51) Int. Cl.
G01B 5/24 (2006.01)
A63C 3/10 (2006.01)

(52) U.S. Cl. .............................. 33/535; 33/533; 280/809

(58) Field of Classification Search .................... 33/3 A, 33/553, 534, 535, 538, 650, 679.1; 280/809
See application file for complete search history.

(56) References Cited

U.S. PATENT DOCUMENTS

| | | | |
|---|---|---|---|
| 4,161,822 A * | 7/1979 | Ayvazian | ........................ 33/571 |
| 4,827,622 A * | 5/1989 | Makar | .............................. 33/770 |
| 5,046,262 A * | 9/1991 | Kerbaugh | ....................... 33/644 |
| 5,345,688 A | 9/1994 | Allen | |
| 5,547,416 A | 8/1996 | Timms | |
| 6,481,113 B1 | 11/2002 | Brenner et al. | |
| 6,594,914 B1 | 7/2003 | Babcock | |
| 7,191,539 B2 | 3/2007 | Zukerman | |
| 7,434,324 B2 | 10/2008 | McKenna | |
| 7,748,130 B2 * | 7/2010 | McKenna | ........................ 33/474 |
| 2009/0090012 A1 * | 4/2009 | Varnedoe | ........................ 33/475 |

FOREIGN PATENT DOCUMENTS

CA 2627706 A1 * 10/2009

* cited by examiner

Primary Examiner — R. A. Smith
(74) Attorney, Agent, or Firm — QuickPatents, Inc.; Kevin Prince

(57) ABSTRACT

A gauge is disclosed for measuring squareness of a skate blade that has a pair of parallel side walls and a pair of bottom blade edges. The gauge includes a squaring frame that has a vertical blade contact surface fixed to a gauge plate. The gauge plate has a horizontal top surface. The vertical blade contact surface is selectively fixed to one of the side walls of the blade with a magnet having at least two parallel faces. Such a magnet is fixable between the skate blade and the blade contact surface. The gauge further includes a blade angle indicator having a flat lower surface and a parallel flat upper surface. Preferably the squaring frame of the gauge further includes an oblong vertical pivot aperture therein and the blade angle indicator includes an aperture therein, such that the squaring frame and the blade angle indicator may be pivotally fixed to each other with a pivot means.

7 Claims, 3 Drawing Sheets

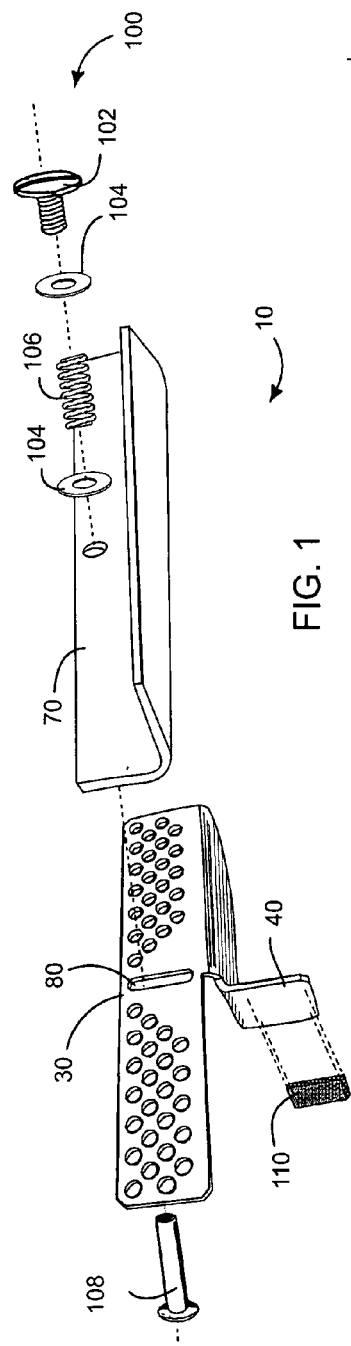
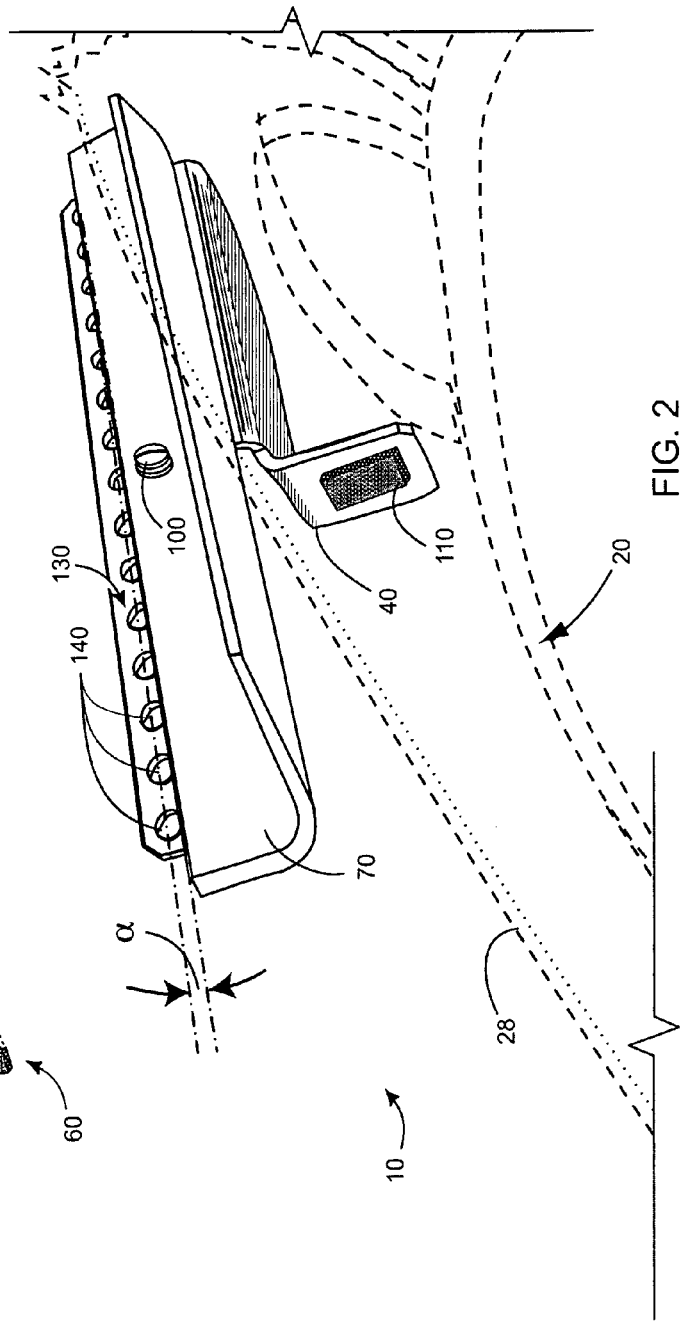
FIG. 1
FIG. 2

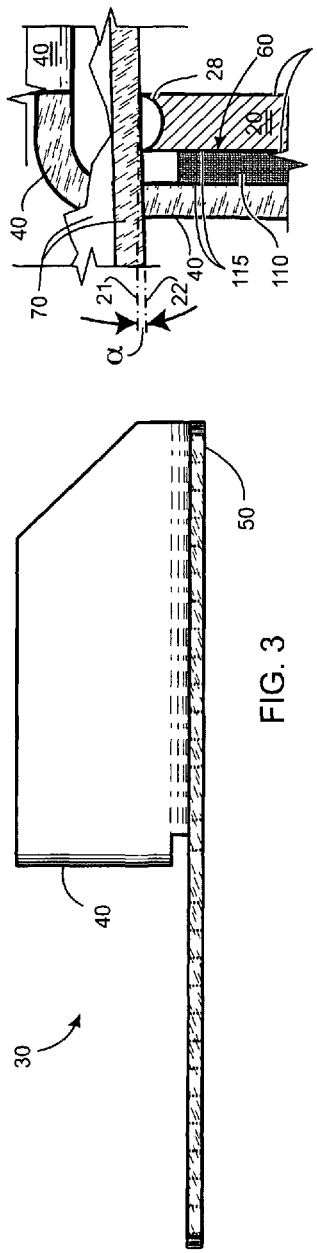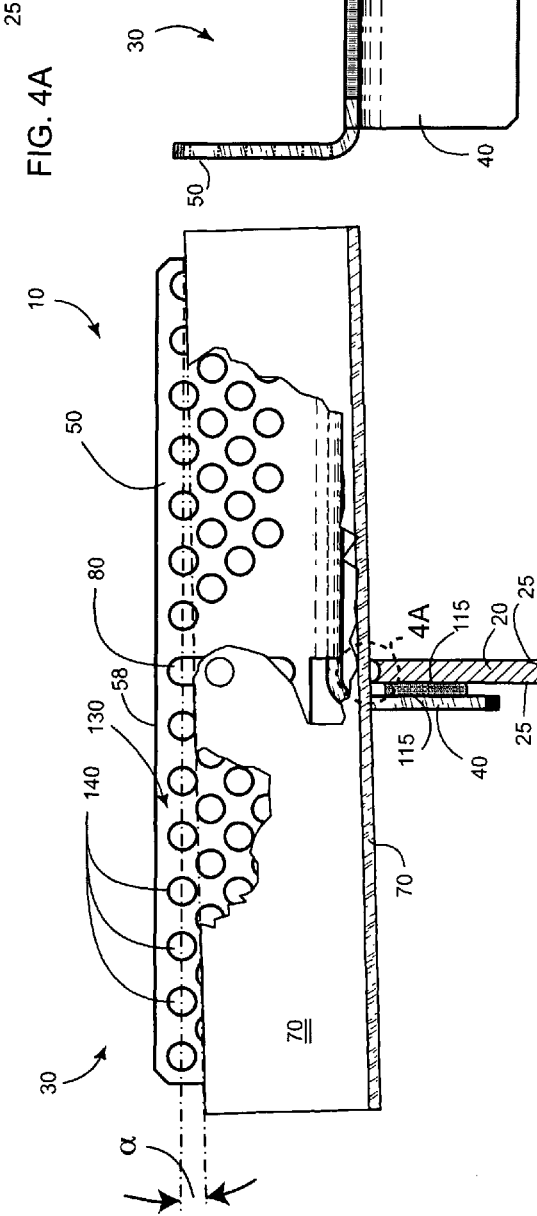

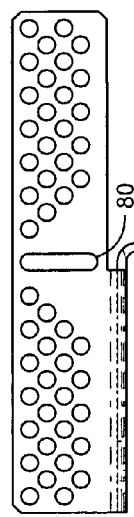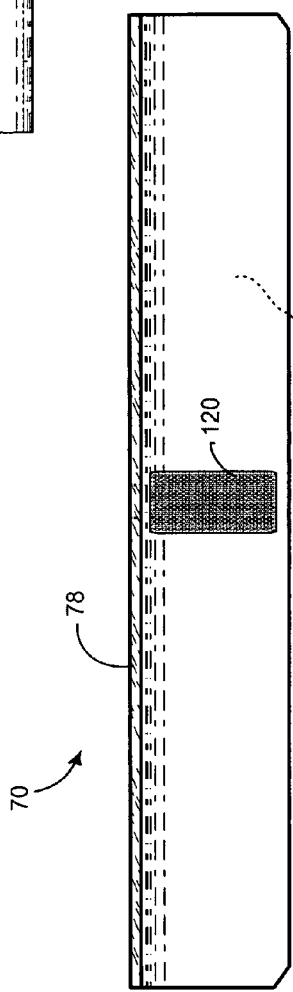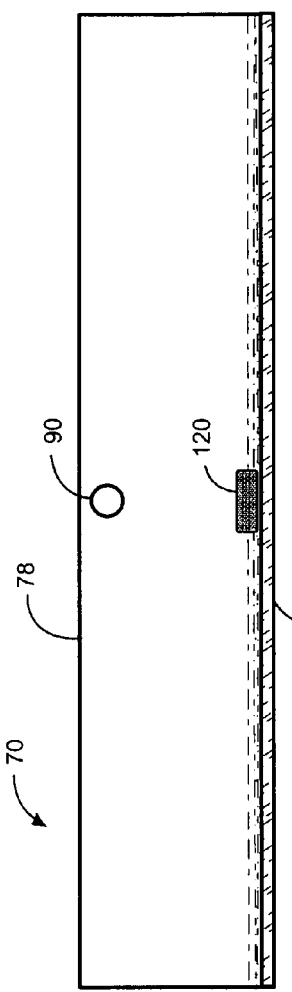

SKATE BLADING SQUARENESS INDICATOR

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to ice skating, and more particularly to an indicator for measuring is squareness of an ice skate blade.

DISCUSSION OF RELATED ART

Skate blades have two sharp contact edges where they meet the ice. When sharpening skate blades, it is important that the two edges be square with respect to the sides of the blade, or what is referred to as having "even edges." Unevenness in the blade edges causes the skater's body to compensate in other areas, impacting the balance of the skater and their ability to skate effectively. Uneven edges create fatigue, forcing the skater to work harder in order to create speed and power when skating. Also, stopping and turning are adversely affected if the skater's skate blades are not even.

Devices for measuring the squareness of ice skate blades are well known in the art. However, despite the development of many approaches for checking the squareness, these approaches often have significant drawbacks. For instance, U.S. Pat. No. 5,547,416 to Timms on Aug. 20, 1996 teaches using a frame to hold the skate and a precision gauge to measure the blade. This type of device serves its purpose, but such a complicated device is inconvenient to transport and is more susceptible to failure due to having a relatively large number of parts. Therefore, there is a need for a device that would be self-contained, easy to use, and be durable. Also, such a needed device would not need periodic calibration or other maintenance.

U.S. Pat. No. 6,594,914 to Babcock on Jul. 22, 2003 and U.S. Pat. No. 7,434,324 to McKenna on Oct. 14, 2008 teach ice skate blade squaring gauge tools. Both the Babcock device and the McKenna device are simplified tools with no moving parts and are designed to be carried on a key chain. This type of gauge provides the advantages of being portable and durable, however, these devices do not provide the advantages of using a standard line with a squaring line to provide a visual angle indication of the level of squareness. Therefore, a device is needed that provides the advantages of portability and a clear visual angle of squareness.

Several devices teach the concept of comparing the slope of the ice-skate edge with a standard line perpendicular to the skate to determine the squareness of the blade by observing if any deviation exists between the two lines. For example, the following patents teach variations of this concept: U.S. Pat. No. 5,345,688 to Allen on Sep. 13, 1994; U.S. Pat. No. 6,481,113 to Brenner et al. on Nov. 19, 2002; and U.S. Pat. No. 7,191,539 to Zukerman on Mar. 20, 2007. However, the Brenner et al. device teaches using a clamping screw to attach the device to the blade, which can be awkward and inconvenient to manually tighten. Therefore, a device is needed that can be quickly and easily attached and removed from the skate blade. Also, such a device still needs to teach the benefit of attaching the gauge in such a way as to be immune to false readings if burrs from blade sharpening remain on the blade.

The Zukerman patent teaches a device that consists of three parts formed from extruded aluminum, two of which are adhered together. Such extruded aluminum is not always square, and thus such a device is not always reliable. Further, the indicia of such a device are parallel lines, which can be confusing and difficult to discern from a casual glance. As the three components are not all held together in such a device, one part may be easily misplaced, rendering the entire device useless. Therefore, a device is needed that provides all the previous listed advantages as well as being a single interconnected device.

Therefore, there is a need for a device that allows a person sharpening skate blades to quickly determine the squareness or evenness of the blades after sharpening. Such a needed device would be easy to selectively attach and remove from the skate blade, and would be immune to false readings if burrs from blade sharpening remain on the blade. Further, such a needed device would be a single self-contained interconnected device, easy to use, and be durable. Such a needed device would not need periodic calibration or other maintenance. The present invention accomplishes these objectives.

SUMMARY OF THE INVENTION

The present device is a gauge for measuring squareness of a skate blade that has a pair of parallel side walls and a pair of bottom blade edges. The gauge includes a squaring frame that has a vertical blade contact surface fixed to a gauge plate. The gauge plate has a horizontal top surface, and preferably angle indicia, such as a plurality of circular apertures formed therethrough. The vertical blade contact surface is selectively fixed to one of the side walls of the blade with a magnetic attachment means, such as a magnet having at least two parallel faces. Such a magnet is fixable between the skate blade and the blade contact surface.

The gauge further includes a blade angle indicator having a flat lower surface and a parallel flat upper surface. The blade angle indicator preferably takes the form of an elongated L-shaped bracket, and is formed from any suitably rigid material such as plastic, metal, or the like.

In use, with the skate inverted and each side wall of the blade held vertical, the blade contact surface of the squaring frame may be attached to one of the side walls of the blade with the magnetic attachment means. The blade indicator may then be rested across the blades edges of the blade such that the upper surface of the blade angle indicator is proximate the horizontal top surface of the squaring frame. The squareness of the blade edges with respect to side walls of the blade is then indicated by comparing the angle between the horizontal top surface of the squaring frame and the upper surface of the blade angle indicator.

Preferably the squaring frame of the gauge further includes an oblong vertical pivot aperture therein and the blade angle indicator includes an aperture therein, such that the squaring frame and the blade angle indicator may be pivotally fixed to each other with a pivot means. Moreover, the present invention is immune to false readings if burrs from blade sharpening remain on the blade, since the magnetic attachment means attached to the blade away from the skate edge. Further, a second magnetic attachment means, such as a second magnet having at least two parallel faces, may be fixed to the angle indicator such that blade edges are magnetically fixed to the angle indicator.

The present invention allows a person sharpening skate blades to quickly determine the squareness or evenness of the blade after sharpening. The present device is easy to selectively attach and remove from the skate blade. Further, the present invention is self-contained, easy to use, durable, and does not need periodic calibration or other maintenance. Other features and advantages of the present invention will become apparent from the following more detailed description, taken in conjunction with the accompanying drawings, which illustrate, by way of example, the principles of the invention.

DESCRIPTION OF THE DRAWINGS

FIG. 1 is an exploded perspective view of the invention;

FIG. 2 is an perspective view of the invention, illustrated in use on a skate blade;

FIG. 3 is a top plan view of a squaring frame of the invention;

FIG. 4 is a front elevational view of the squaring frame of the invention;

FIG. 4A is a partial front elevational view of the invention, taken generally along lines 4A-4A of FIG. 4, showing contact of an angle indicator with the skate blade;

FIG. 5 is a right-side elevation view of the squaring frame of the invention;

FIG. 6 is a top plan view of the angle indicator of the invention;

FIG. 7 is a front elevational view of the angle indicator of the invention;

FIG. 8 is a front elevational view of an alternate squaring frame of the invention; and FIG. 9 is a right-side elevation view of the angle indicator of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

FIGS. 1 and 2 illustrate a gauge 10 for measuring squareness of a skate blade 20 that has a pair of parallel side walls 25 and a pair of bottom blade edges 28.

The gauge 10 includes a squaring frame 30 that has a vertical blade contact surface 40 fixed to a gauge plate 50. The gauge plate 50 has a horizontal top surface 58, and preferably angle indicia 130, such as a plurality of circular apertures 140 formed therethrough. The vertical blade contact surface 40 is selectively fixed to one of the side walls 25 of the blade 20 with a magnetic attachment means 60, such as a magnet 110 having at least two parallel faces 115. Such a magnet 110 is fixable between the skate blade 20 and the blade contact surface 40 (FIG. 4). The squaring frame 30 is made from a suitable rigid material such as plastic or metal. The squaring frame 30 may take the form of a generally L-shaped bracket, with the blade contact surface 40 being bent 90-degrees from the horizontal (FIGS. 3, 5 and 8).

The gauge 10 further includes a blade angle indicator 70 having a flat lower surface 72 and a parallel flat upper surface 78 (FIGS. 6, 7 and 9). The blade angle indicator 70 preferably takes the form of an elongated L-shaped bracket, and is formed from any is suitably rigid material such as plastic, metal, or the like.

In use, with the skate inverted and each side wall 25 of the blade 20 held vertical, the blade contact surface 40 of the squaring frame 30 may be attached to one of the side walls 25 of the blade 20 with the magnetic attachment means 60. The user can attach the squaring frame 30 with the magnetic attachment means 60 below or away from the blade edges 28, thereby avoiding burrs that may be present proximate the blade edges 28 from sharpening. The blade indicator 70 may then be rested across the blades edges 28 of the blade 20 such that the upper surface 78 of the blade angle indicator 70 is proximate the horizontal top surface 58 of the squaring frame 30. The squareness of the blade edges 28 with respect to side walls 25 of the blade 20 is then indicated by comparing the angle α between the horizontal top surface 58 of the squaring frame 30 and the upper surface 78 of the blade angle indicator 70 (FIGS. 2 and 4).

Preferably the squaring frame 30 of the gauge 10 further includes an oblong vertical pivot aperture 80 therein and the blade angle indicator 70 includes an aperture 90 therein, such that the squaring frame 30 and the blade angle indicator 70 may be pivotally fixed to each other with a pivot means 100, such as a pivot bolt 102 and pivot nut 108. The pivot means 100 may further include a pivot spring 106 sandwiched between two washers 104 so that the squaring frame 30 and the blade angle 70 may be rotated with respect to each other selectively, such that then angle α may be measured and then fixed as the gauge 10 is removed from the blade 20. Circular apertures 140 are relatively easy to visually mutually compare, as slight variations in the angle α result in relatively large differences in the resulting size and shape of such circular apertures 140 at opposing ends of the blade angle 70.

In one embodiment of the invention, a second magnetic attachment means 120, such as a second magnet 110 having at least two parallel faces 115, is fixed to the angle indicator 70 such that blade edges 28 are magnetically fixed to the angle indicator 70. Such a second magnetic attachment means 120 may be fixed above the angle indicator 70 in the case where the angle indicator 70 is a non-magnetically attractive plastic, or the like, the magnetic force from the second magnetic attachment means 120 fixing the angle indicator 70 against the blade edges 28. Alternately, in the case where the angle indicator 70 is made from a magnetically attractive metal, for example, the second magnetic attachment means 120 may be fixed to the lower surface 72 of the blade angle indicator 70 and the blade edges 28 magnetically fixed to the second magnetic attachment means 120 directly.

While a particular form of the invention has been illustrated and described, it will be apparent that various modifications can be made without departing from the spirit and scope of the invention. For example, the angle indicia 130 may also take the form of measurement lines (not shown), or other indicator marks as desired. Accordingly, it is not intended that the invention be limited, except as by the appended claims.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in its implementation details, while still being encompassed by the invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be is exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A gauge for measuring squareness of a skate blade of a skate, the skate blade having a pair of side walls and a pair of bottom blade edges, the gauge comprising:
   a squaring frame having a vertical blade contact surface fixed to a gauge plate having a horizontal top surface, the vertical blade contact surface selectively fixed to one of the side walls of the blade with a magnetic attachment means; and
   a blade angle indicator having a flat lower surface and a flat upper surface, the lower and upper surfaces being parallel;
   the squaring frame further including an oblong vertical pivot aperture therein and the blade angle indicator including an aperture therein, the squaring frame and the blade angle indicator pivotally fixable to each other with a pivot means;
   whereby with the skate inverted and each side wall of the blade held vertical, the blade contact surface of the squaring frame may be attached to one of the side walls of the blade with the magnetic attachment means, and the blade angle indicator may be rested across the blades edges of the blade such that the upper surface of the blade angle indicator is proximate the horizontal top surface of the squaring frame, the squareness of the blade edges with respect to side walls of the blade being indicated by comparing the angle between the horizontal top surface of the squaring frame and the upper surface of the blade angle indicator.

2. The gauge of claim 1 wherein the magnetic attachment means is a magnet having at least two parallel faces and fixable between the skate blade and the blade contact surface.

3. The gauge of claim 1 wherein the blade angle indicator further includes a second magnetic attachment means for securing the blade angle indicator to the skate blade magnetically.

4. The gauge of claim 1 wherein the gauge plate further includes angle indicia thereon, the upper surface of the blade angle indicator being positionable thereagainst so as to indicate squareness of the blade edges with respect to side walls of the blade.

5. A gauge for measuring squareness of a skate blade of a skate, the skate blade having a pair of side walls and a pair of bottom blade edges, the gauge comprising:
   a squaring frame having a vertical blade contact surface fixed to a gauge plate having a horizontal top surface, the vertical blade contact surface selectively fixed to one of the side walls of the blade with a magnetic attachment means; and
   a blade angle indicator having a flat lower surface and a flat upper surface, the lower and upper surfaces being parallel;

the gauge plate further including angle indicia thereon, the upper surface of the blade angle indicator being positionable thereagainst so as to indicate squareness of the blade edges with respect to side walls of the blade, the angle indicia is comprised of a plurality of circular apertures formed through the gauge plate;

whereby with the skate inverted and each side wall of the blade held vertical, the blade contact surface of the squaring frame may be attached to one of the side walls of the blade with the magnetic attachment means, and the blade indicator may be rested across the blades edges of the blade such that the upper surface of the blade angle indicator is proximate the horizontal top surface of the squaring frame, the squareness of the blade edges with respect to side walls of the blade being indicated by comparing the angle between the horizontal top surface of the squaring frame and the upper surface of the blade angle indicator.

6. The gauge of claim 5 wherein the magnetic attachment means is a magnet having at least two parallel faces and fixable between the skate blade and the blade contact surface.

7. The gauge of claim 5 wherein the blade angle indicator further includes a second magnetic attachment means for securing the blade angle indicator to the skate blade magnetically.

* * * * *